US010920885B2

(12) United States Patent
Cho

(10) Patent No.: US 10,920,885 B2
(45) Date of Patent: Feb. 16, 2021

(54) METHOD FOR REDUCING TORSIONAL SHOCK OF DRIVING SYSTEM OF ELECTRIC VEHICLE

(71) Applicants: Hyundai Motor Company, Seoul (KR); Kia Motors Corporation, Seoul (KR)

(72) Inventor: Woo Cheol Cho, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/560,613

(22) Filed: Sep. 4, 2019

(65) Prior Publication Data

US 2020/0292075 A1     Sep. 17, 2020

(30) Foreign Application Priority Data

Mar. 15, 2019   (KR) .................. 10-2019-0029686

(51) Int. Cl.
| | | |
|---|---|---|
| *F16H 63/48* | (2006.01) | |
| *F16H 59/54* | (2006.01) | |
| *B60W 30/18* | (2012.01) | |
| *F16H 63/50* | (2006.01) | |
| *B60W 40/13* | (2012.01) | |
| *B62D 55/108* | (2006.01) | |

(52) U.S. Cl.
CPC ..... *F16H 63/483* (2013.01); *B60W 30/18118* (2013.01); *B62D 55/108* (2013.01); *F16H 59/54* (2013.01); *F16H 63/502* (2013.01); *B60W 2040/1384* (2013.01)

(58) Field of Classification Search
CPC .............. F16H 63/483; F16H 59/54; B60W 30/18118; B60W 63/502; B60W 2040/1384; B62D 55/108
See application file for complete search history.

(56) References Cited

U.S. PATENT DOCUMENTS

| | | | | |
|---|---|---|---|---|
| 8,764,608 | B2 * | 7/2014 | Lim ..................... | B60W 30/20 477/194 |
| 9,211,810 | B2 * | 12/2015 | Nagamori ....... | B60W 30/18027 |
| 9,931,962 | B2 * | 4/2018 | Suzuki .................... | B60L 3/102 |
| 2012/0316034 | A1 * | 12/2012 | Lim .................... | B60W 40/076 477/183 |

* cited by examiner

*Primary Examiner* — Tinh Dang
(74) *Attorney, Agent, or Firm* — Mintz Levin Cohn Ferris Glovsky and Popeo, P.C.; Peter F. Corless

(57) ABSTRACT

A method for reducing torsional shock of a driving system of an electric vehicle is provided. In the method, torsional torque of a part of the driving system is calculated by applying motor torque to a motor under the condition that a parking gear is engaged and monitoring a motor speed. Reverse torsional torque having the same magnitude as the calculated torsional torque is applied to the part of the driving system when release of the parking gear is requested, and then the parking gear is released to reduce shock caused by torsion of the part of the driving system when the parking gear is released.

10 Claims, 6 Drawing Sheets

- WHEN PARKED ON FLAT SURFACE -

- WHEN PARKED ON SLOPE -

METHOD FOR REDUCING TORSIONAL SHOCK OF DRIVING SYSTEM OF ELECTRIC VEHICLE

CROSS-REFERENCE TO RELATED APPLICATION

This application claims under 35 U.S.C. § 119(a) the benefit of priority to Korean Patent Application No. 10-2019-0029686 filed on Mar. 15, 2019, the entire contents of which are incorporated herein by reference.

BACKGROUND

(a) Technical Field

The present disclosure relates to a method for reducing torsional shock of a driving system part of an electric vehicle, and more particularly, to a method for reducing torsional shock of a driving system of an electric vehicle in which torsion of a part of a driving system occurring during parking of the electric vehicle on a slope may be sensed and shock caused by the torsion of the part of the driving system may be reduced.

(b) Background Art

In general, a driving system of an electric vehicle includes, as exemplarily shown in FIG. 1 of the related art, a motor 10 serving as a driving source, a reducer 20 connected to an output shaft of the motor 10, a drive shaft 30 coaxially connected to an output gear 21 of the reducer 20, etc. The driving system of the electric vehicle further includes a parking gear 22 which confines the output gear 21 of the reducer 20 by operation of a solenoid when a driver shifts a gear lever to the park (P) position.

When the parking gear 22 is not engaged with the output gear 21 of the reducer 20 during parking of the electric vehicle (particularly, on a slope), torsional energy is not generated at the drive shaft 30, but driving wheels are first rotated, the drive shaft 30 is rotated together with rotation of the driving wheels and thus the vehicle is driven along a downhill road, thereby causing a safety accident.

On the other hand, when the parking gear 22 is engaged with the output gear 21 of the reducer 20 during parking of the electric vehicle (particularly, on a slope), the drive shaft 30 coaxially connected to the output gear 21 of the reducer 20 is confined by the parking gear 22, and thus, the vehicle is not driven but is pushed back by gravity. In particular, the force of pushing the vehicle back by gravity is primarily transmitted to tires contacting the ground and the force transmitted to the tires secondarily acts as force to rotate the drive shaft 30. However, since the output gear 21 of the reducer 20 is confined by the parking gear 22, the drive shaft 30 coaxially connected to the output gear 21 is not rotated.

Accordingly, the vehicle is not moved since the parking gear 22 confines the output gear 21 of the reducer 20, but torsional energy equal to the force of pushing the vehicle back by gravity is generated at the drive shaft 30. Thereafter, when parking of the vehicle is released (e.g., shift from the P position to the drive(D) position), the drive shaft 30 at which torsion occurs is restored to an original state prior to occurrence of torsion, and, during such a restoring process, shock and vibration are generated from the vehicle.

In other words, in the parked state of the electric vehicle on a slope (e.g., at the P position), torsional energy is accumulated at a part of the driving system, such as the drive shaft 30, by gradient load of the vehicle and thereafter, if the P position is released (e.g., shift from the P position to the D position), when torsion accumulated at the part of the driving system, such as the drive shaft 30, is released, momentary shock is generated, and, as the weight of the vehicle and the grade of the slope are increased, such torsion of the part of the driving system is increased and may thus cause greater shock and vibration.

Therefore, to reduce such shock, a hardware improvement method for changing the structure of an output gear of a reducer or a parking gear to a structure in which backlash may be removed was conventionally employed, but such a method is unable to reduce torsional energy of a part of a driving system, i.e., a fundamental cause of shock occurring when the P position is released, and is thus limited in shock mitigation.

As described above, torsional energy is accumulated at the part of the driving system, such as the drive shaft 30, after the vehicle is parked on a slope, and thereafter, if the P position is released (e.g., shift from the P position to the D position), shock is generated in the vehicle by the torsional energy accumulated at the drive shaft 30, and particularly, the electric vehicle in which the motor 10 is connected to the drive shaft 30 through the reducer 20 does not have a shock reduction apparatus, such as a torque converter or a transmission, and thus such shock is transmitted to a driver as is.

SUMMARY

The present invention provides a method for reducing torsional shock of a driving system of an electric vehicle in which torsional torque of a part of the driving system is calculated by applying motor torque to a motor under the condition that a parking gear is engaged and monitoring a motor speed, reverse torsional torque having the same magnitude as the calculated torsional torque is applied to the part of the driving system when release of the parking gear is requested, and then the parking gear is released, to reduce shock caused by torsion of the part of the driving system when the parking gear is released.

It is another object of the present invention to provide a method for reducing torsional shock of a driving system of an electric vehicle in which torsional torque of a part of the driving system is calculated using an amount of motor speed fluctuation or an amount of vehicle acceleration fluctuation when a brake is released after the parking gear is engaged, reverse torsional torque having the same magnitude as the calculated torsional torque is applied to the part of the driving system when release of the parking gear is requested, and then the parking gear is released, to reduce shock caused by torsion of the part of the driving system when the parking gear is released.

In one aspect, the present invention provides a method for reducing torsional shock of a driving system of an electric vehicle that may include applying, by a motor controller, motor torque to a motor while regularly increasing the motor torque, when a parking gear is engaged and a brake is released, monitoring, by a motor speed sensor, a motor speed generated by the motor torque applied to the motor and transmitting the motor speed to the motor controller, calculating, by the motor controller, motor torque at a point in time when the motor speed fluctuates as torsional torque of a part of the driving system, and applying, by the motor controller, torque having the same magnitude as the calculated torsional torque to the motor to be transmitted to the part of the driving system, when a request to release the parking gear is received, and then performing release of the parking gear.

In a further aspect, the present invention provides a method for reducing torsional shock of a driving system of an electric vehicle that may include applying, by a motor controller, motor torque to a motor while regularly increasing the motor torque, when a request to release a parking gear is received under the condition that the parking gear is engaged, monitoring, by a motor speed sensor, a motor speed generated by the motor torque applied to the motor and transmitting the motor speed to the motor controller, and maintaining, by the motor controller, motor torque at a point in time when the motor speed fluctuates for a designated time, and then performing release of the parking gear.

In another aspect, the present invention provides a method for reducing torsional shock of a driving system of an electric vehicle that may include monitoring, by a motor speed sensor, a motor speed and transmitting the motor speed to a motor controller, when a parking gear is engaged and a brake is released, calculating, by the motor controller, an amount of motor speed fluctuation and calculating torsional torque of a part of the driving system based on the calculated amount of motor speed fluctuation, and applying, by the motor controller, torque having the same magnitude as the calculated torsional torque to a motor to be transmitted to the part of the driving system, when a request to release the parking gear is received, and then performing release of the parking gear.

In yet another aspect, the present invention provides a method for reducing torsional shock of a driving system of an electric vehicle that may include monitoring, by a vehicle acceleration sensor, an acceleration of the electric vehicle and transmitting the acceleration to a motor controller, when a parking gear is engaged and a brake is released, calculating, by the motor controller, an amount of acceleration fluctuation and calculating torsional torque of a part of the driving system based on the calculated amount of acceleration fluctuation, and applying, by the motor controller, torque having the same magnitude as the calculated torsional torque to a motor to be transmitted to the part of the driving system, when a request to release the parking gear is received, and then performing release of the parking gear.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
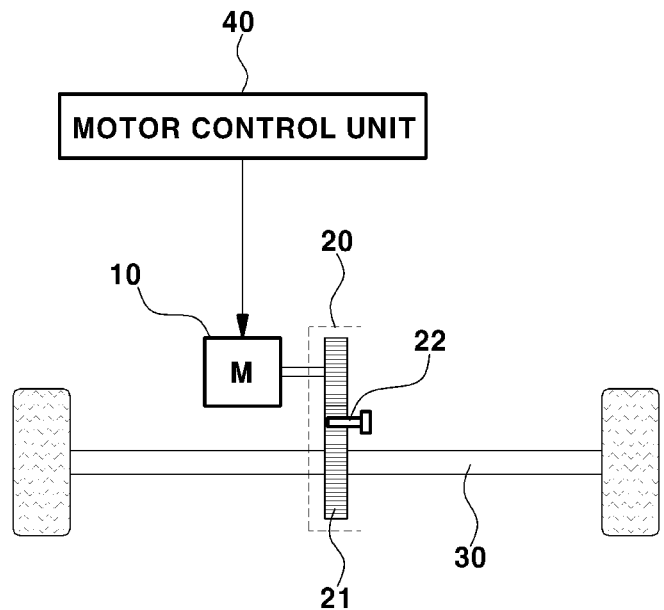
FIG. 1 is a view schematically illustrating a driving system of an electric vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

Figure 2:
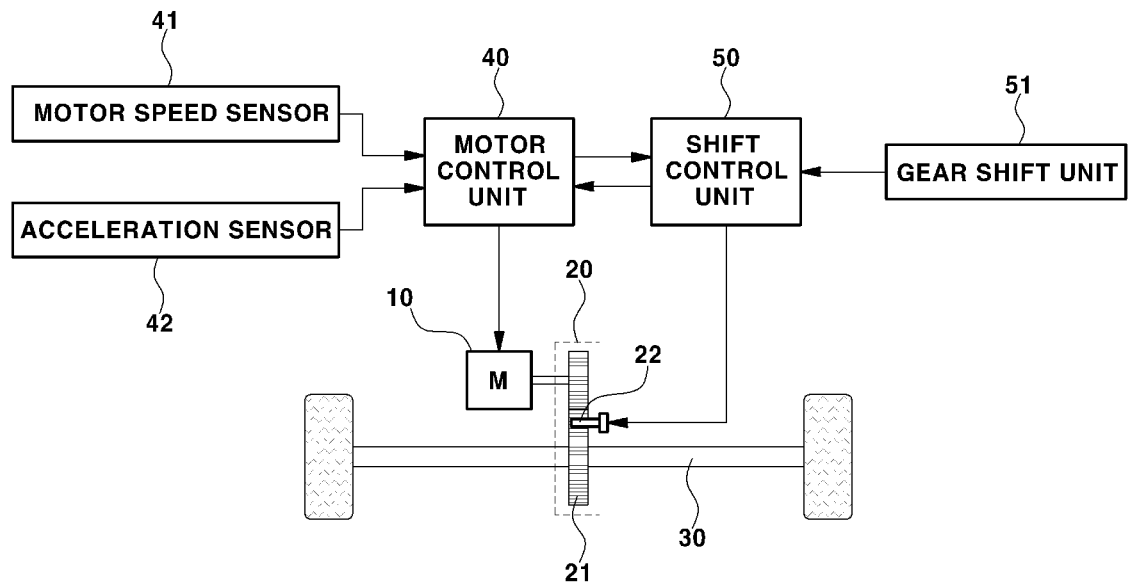
FIG. 2 is a control block diagram illustrating reduction of torsional shock of a driving system of an electric vehicle in accordance with an exemplary embodiment of the present invention.

FIG. 2 is a control block diagram illustrating reduction of torsional shock of a driving system of an electric vehicle in accordance with the present invention. As exemplarily shown in FIG. 2, a driving system of an electric vehicle may include a motor 10 serving as a driving source, a reducer 20 connected to an output shaft of the motor 10, and a drive shaft 30 coaxially connected to an output gear 21 of the reducer 20. Additionally, the driving system of the electric vehicle may further include a parking gear 22 which confines the output gear 21 of the reducer 20 by operation of a solenoid when a driver shifts a gear lever to the park (P) position.

Further, a plurality of controllers configured to reduce torsional shock of the driving system in accordance with the present invention may include a motor controller 40 configured to operate the motor 10, a motor speed sensor 41 and an acceleration sensor 42, which are connected to an input side of the motor controller 40 to transmit electrical signals to the motor controller 40, and a shift controller 50 configured to operate the parking gear 22 based on a gear shift signal of a gear shift unit 51.

Hereinafter, methods for reducing torsional shock of the driving system having the above-described configuration in accordance with respective exemplary embodiments of the present invention will be described.

First Embodiment

Figure 3:
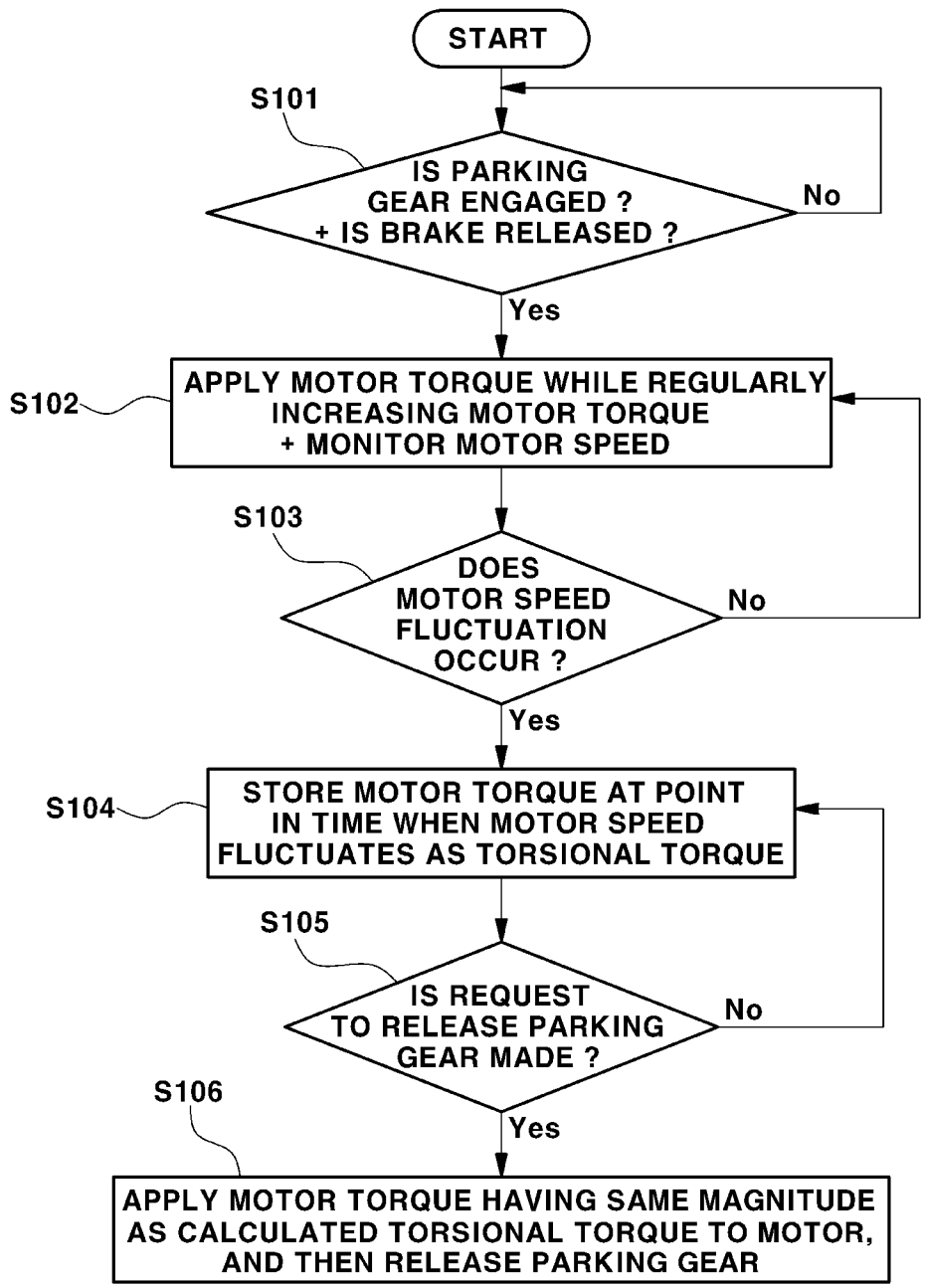
FIG. 3 is a flowchart illustrating a method for reducing torsional shock of a driving system of an electric vehicle in accordance with an exemplary embodiment of the present invention.

FIG. 3 is a flowchart illustrating a method for reducing torsional shock of a driving system of an electric vehicle in accordance with an exemplary embodiment of the present invention. First, whether the parking gear 22 is engaged and whether a brake is released may be confirmed (Operation S101).

When a driver shifts the gear lever to the P position through the gear shift unit 51, a P position signal is transmitted to the shift controller 50, the shift controller 50 may be configured to transmit the P position signal to the motor controller 40, and the motor controller 40 may be configured to determine that the parking gear 22 is in an engaged state. Further, when the driver disengages a brake pedal, a brake release signal is transmitted to the motor controller 40, and the motor controller 40 may be configured to determine that the brake is in a released state.

Thereafter, the motor controller 40 may be configured to apply motor torque to the motor 10 while regularly increasing the motor torque, and at the same time, monitor a motor speed (Operation S102). In particular, the motor speed sensor 41 may be configured to monitor the motor speed generated by the motor torque applied to the motor 10 and transmit the motor speed to the motor controller 40.

Thereafter, whether fluctuation of the motor speed occurs may be confirmed (Operation S103). For this purpose, the motor controller 40 may be configured to confirm whether fluctuation of the motor speed occurs based on a signal transmitted from the motor speed sensor 41. Upon confirming that fluctuation of the motor speed occurs, the motor controller 40 may be configured to calculate motor torque at a point in time when the motor speed fluctuates, i.e., motor torque at a point in time when the motor speed starts to fluctuate, as torsional torque of a driving system part (e.g., the drive shaft 30) (Operation S104).

Figure 8A:
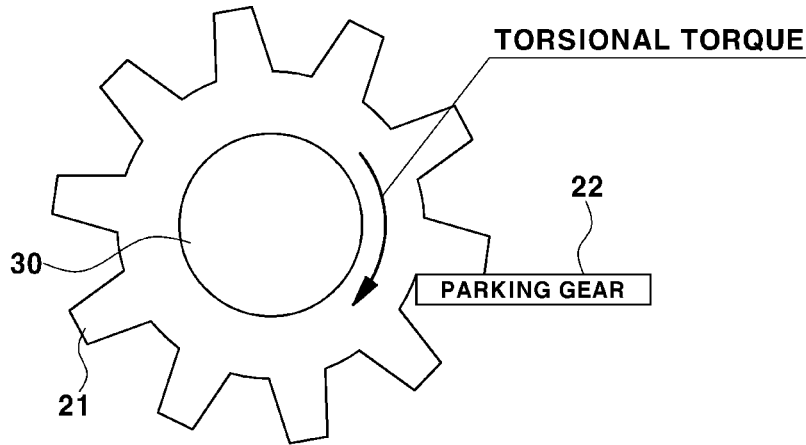
FIGS. 8A and 8B are schematic views illustrating release of torsion of the drive shaft by a method for reducing torsional shock of a driving system of an electric vehicle in accordance with an exemplary embodiment of the present invention.
Figure 8B:
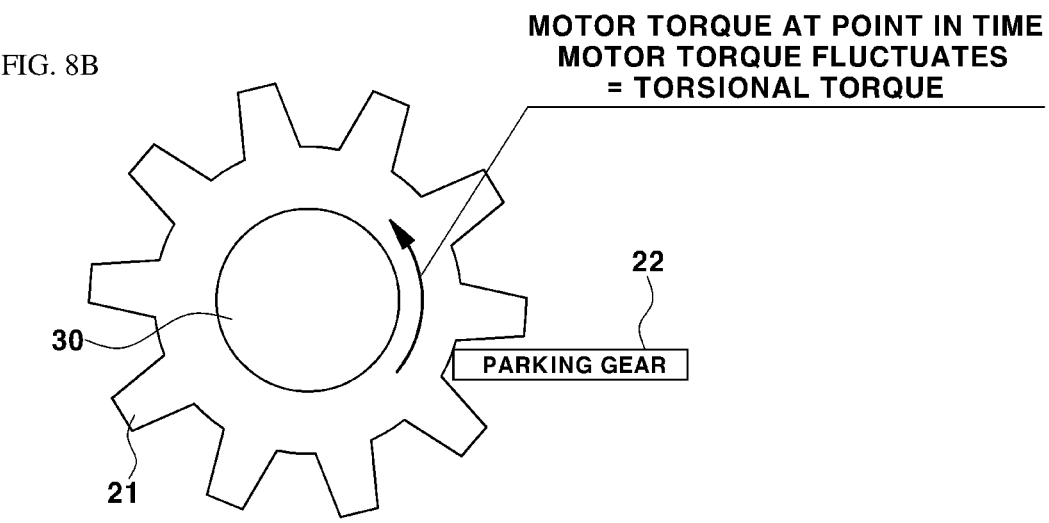

As exemplarily shown in FIG. 8A, torsional torque is generated at the drive shaft 30 when the parking gear 22 is engaged with the output gear 21, and, as exemplarily shown in FIG. 8B, motor torque at the point in time when the motor speed starts to fluctuate is transmitted to the drive shaft 30 and thus torsional torque of the drive shaft 30 may be released. Accordingly, the motor controller 40 may be configured to calculate motor torque at the point in time when the motor speed starts to fluctuate as torsional torque of the driving system part (e.g., the drive shaft 30), and store the torsional torque of the driving system part.

In other words, the magnitude of motor torque at the point in time when the motor speed starts to fluctuate is the same as the magnitude of torsional torque generated at the drive shaft 30, and thus motor torque at the point in time when the motor speed starts to fluctuate may be calculated as torsional torque of the drive shaft 30 which is a part of the driving system, and may be stored. Thereafter, whether a request to release the parking gear 22 is received may be confirmed (Operation S105).

When the driver shifts the gear lever from the P position to the drive (D) position through the gear shift unit 51, a D position signal is transmitted to the shift controller 50, the shift controller 50 may be configured to transmit the D position signal to the motor controller 40, and the motor controller 40 may be configured to determine that the request to release the parking gear 22 is received. Thereafter, the motor controller 40 may be configured to apply motor torque to the motor 10 to remove torsion of the drive shaft 30 prior to actual release of the parking gear 22, and, at this time, the motor torque having the same magnitude as the torsional torque calculated in Operation S104 may be applied to the motor 10 (Operation S106).

When the motor torque having the same magnitude as the torsional torque calculated in Operation S104 is applied to the motor 10, the applied motor torque may be sequentially transmitted to the output gear 21 of the reducer 20 connected to the output shaft of the motor 10 and the drive shaft 30 coaxially connected to the output gear 21 of the reducer 20, and thus torsion of the drive shaft 30 may be removed.

As exemplarily shown in FIG. 8B, torque (i.e., the motor torque at the point in time when the motor speed starts to fluctuate) having the same magnitude as the torsional torque calculated in Operation S104 may be transmitted to the drive shaft 30 prior to actual release of the parking gear 22, and thus, torsional torque of the drive shaft 30 may be released. Thereafter, the motor controller 40 may be configured to transmit a parking gear release permissive signal to the shift controller 50, the shift controller 50 may be configured to apply an operation control signal to the solenoid to operate the parking gear 22, the parking gear 22 may be disengaged from the output gear 21 of the reducer 20 by operation of the solenoid, and thereby actual release of the parking gear 22 may be performed.

As described above, since, after parking of the vehicle on a slope, torsional torque generated at the drive shaft 30 is calculated and, when release of the parking gear 22 is requested, actual release of the parking gear 22 may be performed under the condition that the torsional torque of the drive shaft 30 is removed, shock conventionally applied to a vehicle due to torsional energy accumulated on a drive shaft when a parking gear is released may be reduced.

Second Embodiment

Figure 4:
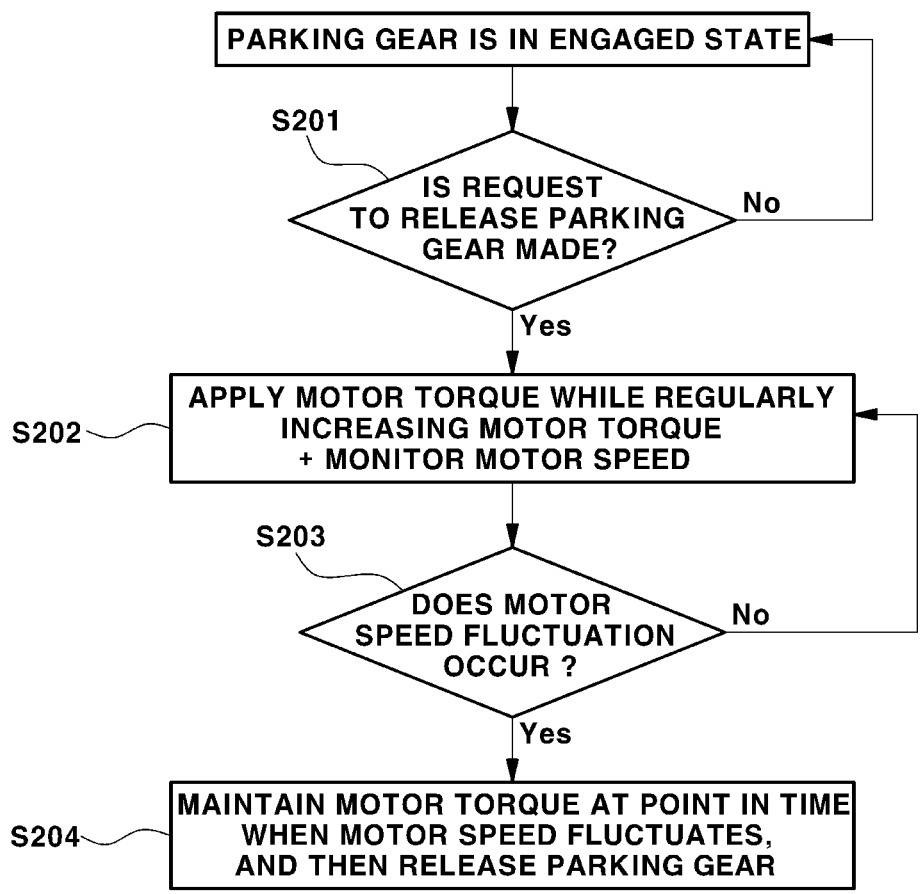
FIG. 4 is a flowchart illustrating a method for reducing torsional shock of a driving system of an electric vehicle in accordance with an exemplary embodiment of the present invention.

FIG. 4 is a flowchart illustrating a method for reducing torsional shock of a driving system of an electric vehicle in accordance with an exemplary embodiment of the present invention. Differently from the method in accordance with the previously described embodiment, the method in accordance with this exemplary embodiment of the present invention is characterized in that torsional torque of the drive shaft 30 corresponding to a part of the driving system is not calculated in advance and, when a request to release the parking gear 22 is received, the torsional torque of the drive shaft 30 is released and then actual release of the parking gear 22 may be performed.

First, whether a request to release the parking gear 22 is received may be confirmed under the condition that the parking gear 22 is in the engaged state (Operation S201). When a driver shifts the gear lever from the P position to the D position through the gear shift unit 51, a D position signal is transmitted to the shift controller 50, the shift controller 50 may be configured to transmit the D position signal to the motor controller 40, and the motor controller 40 may be configured to determine that the request to release the parking gear 22 is received.

Thereafter, the motor controller 40 may be configured to apply motor torque to the motor 10 while regularly increasing the motor torque, and at the same time, monitor a motor speed (Operation S202). In particular, the motor speed sensor 41 may be configured to monitor the motor speed generated by the motor torque applied to the motor 10 and transmit the motor speed to the motor controller 40. Thereafter, whether fluctuation of the motor speed occurs may be confirmed (Operation S203). For this purpose, the motor controller 40 may be configured to confirm whether fluctuation of the motor speed occurs based on a signal transmitted from the motor speed sensor 41.

In response to confirming that fluctuation of the motor speed occurs, the motor controller 40 may be configured to maintain motor torque at a point in time when the motor speed fluctuates, i.e., motor torque at a point in time when the motor speed starts to fluctuate, for a designated time (Operation S204). In other words, in response to confirming that fluctuation of the motor speed occurs, the motor controller 40 does not increase the motor torque any more, and may be configured to maintain the motor torque at the point in time when the motor speed starts to fluctuate, as torque applied to the motor 10 for a designated period of time.

Particularly, the motor torque at the point in time when the motor speed starts to fluctuate may be sequentially transmitted to the output gear 21 of the reducer 20 connected to the output shaft of the motor 10 and the drive shaft 30 coaxially connected to the output gear 21 of the reducer 20, and thus torsion of the drive shaft 30 may be removed.

As exemplarily shown in FIG. 8B, the motor torque at the point in time when the motor speed starts to fluctuate may be transmitted to the drive shaft 30 prior to actual release of the parking gear 22, and thus, torsional torque of the drive shaft 30 may be released. Thereafter, the motor controller 40 may be configured to transmit a parking gear release permissive signal to the shift controller 50, the shift controller 50 may be configured to apply an operation control signal to the solenoid to operate the parking gear 22, the parking gear 22 may be disengaged from the output gear 21 of the reducer 20 by operation of the solenoid, and thereby actual release of the parking gear 22 may be performed.

As described above, since, when a request to release the parking gear 22 is received, actual release of the parking gear 22 may be performed under the condition that the torsional torque of the drive shaft 30 is removed, shock conventionally applied to a vehicle due to torsional energy accumulated on a drive shaft when a parking gear is released may be reduced.

Third Embodiment

Figure 5:
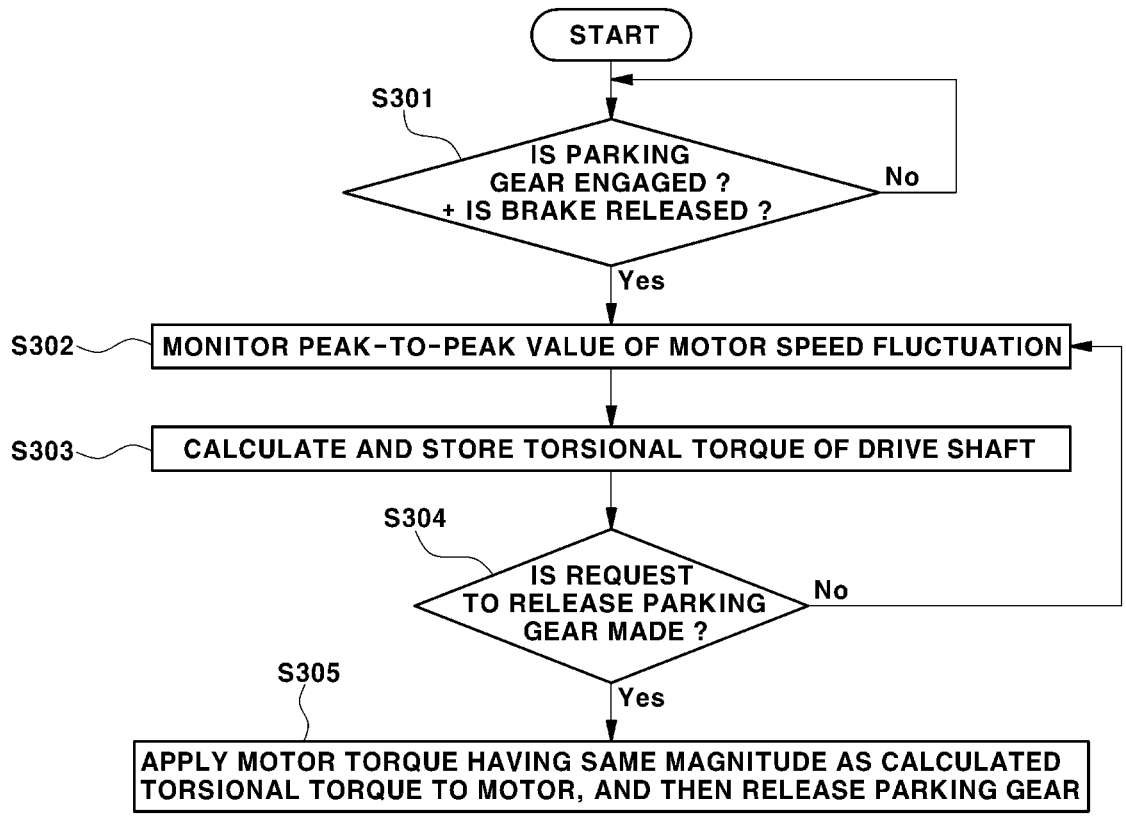
FIG. 5 is a flowchart illustrating a method for reducing torsional shock of a driving system of an electric vehicle in accordance with an exemplary embodiment of the present invention.

FIG. 5 is a flowchart illustrating a method for reducing torsional shock of a driving system of an electric vehicle in accordance with an exemplary embodiment of the present invention. First, whether the parking gear 22 is engaged and whether a brake is released may be confirmed (Operation S301).

When a driver shifts the gear lever at the P position through the gear shift unit 51, a P position signal is transmitted to the shift controller 50, the shift controller 50 may be configured to transmit the P position signal to the motor controller 40, and the motor controller 40 may be configured to determine that the parking gear 22 is in the engaged state. Further, when the driver disengages a brake pedal, a brake release signal is transmitted to the motor controller 40, and the motor controller 40 may be configured to determine that the brake is in the released state.

Thereafter, an amount of motor speed fluctuation may be monitored and calculated (Operation S302). In particular, when the motor speed sensor 41 monitors the motor speed and transmits the motor speed to the motor controller 40, the motor controller 40 may be configured to calculate the amount of motor speed fluctuation.

Figure 7A:
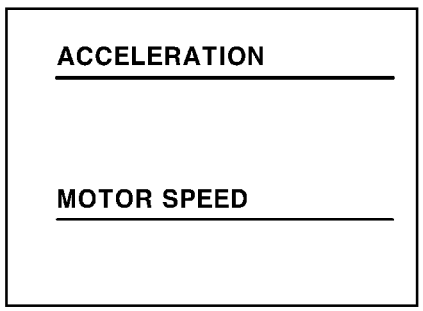
FIGS. 7A and 7B are waveform diagrams showing fluctuations of a vehicle acceleration and a motor speed, when torsion of a drive shaft corresponding to a part of a driving system occurs in accordance with an exemplary embodiment of the present invention.
Figure 7B:
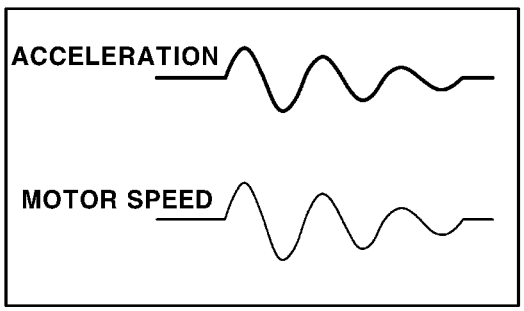

As exemplarily shown in FIG. 7A, if the vehicle is parked on a flat surface, even when the brake is released after the parking gear 22 is engaged, torsion is not generated at the drive shaft 30 and thus a motor speed does not fluctuate in a state before starting-off of the vehicle. On the contrary, as exemplarily shown in FIG. 7B, if the vehicle is parked on a slope or inclined road surface, when the brake is released after the parking gear 22 is engaged, torsion is generated at the drive shaft 30, the vehicle is slightly pushed back at the same time, and a motor speed fluctuates.

Accordingly, the motor controller 40 may be configured to calculate a difference between an upper peak and a lower peak, i.e., a peak-to-peak value, when the motor speed fluctuates, as the amount of motor speed fluctuation. Thereafter, the motor controller 40 may be configured to calculate current torsional torque of the drive shaft 30 corresponding to a part of the driving system based on the calculated amount of motor speed fluctuation, and store the calculated current torsional torque of the drive shaft 30 (Operation S303).

For this purpose, when the current torsional torque of the drive shaft 30 based on the calculated amount of motor speed fluctuation is calculated, amounts of motor speed fluctuation according to road slopes measured in advance through tests and torsional torques of the drive shaft 30 according to the amounts of motor speed fluctuation measured in advance through tests are built as map data, and the map data may be stored in the motor controller 40.

Therefore, the motor controller 40 may be configured to store the amount of motor speed fluctuation calculated in Operation S302 into the map data, acquire the current torsional torque of the drive shaft 30 corresponding to the amount of motor speed fluctuation stored into the map data, and store the current torsional torque of the drive shaft 30. Thereafter, whether a request to release the parking gear 22 is received may be confirmed (Operation S304).

When the driver shifts the gear lever from the P position to the D position through the gear shift unit 51, a D position signal is transmitted to the shift controller 50, the shift controller 50 may be configured to transmit the D position signal to the motor controller 40, and the motor controller 40 may be configured to determine that the request to release the parking gear 22 is received. Thereafter, the motor controller 40 may be configured to apply motor torque to the motor 10 to remove torsion of the drive shaft 30 prior to actual release of the parking gear 22, and, at this time, the motor torque having the same magnitude as the torsional torque calculated based on the amount of motor speed fluctuation in Operation S303 may be applied to the motor 10 (Operation S305).

When the motor torque having the same magnitude as the torsional torque calculated based on the amount of motor speed fluctuation in Operation S303 is applied to the motor 10, the applied motor torque may be sequentially transmitted to the output gear 21 of the reducer 20 connected to the output shaft of the motor 10 and the drive shaft 30 coaxially connected to the output gear 21 of the reducer 20, and thus torsion of the drive shaft 30 may be removed. Thereafter, the motor controller 40 may be configured to transmit a parking gear release permissive signal to the shift controller 50, the shift controller 50 may be configured to apply an operation control signal to the solenoid to operate the parking gear 22, the parking gear 22 may be disengaged from the output gear 21 of the reducer 20 by operation of the solenoid, and thereby actual release of the parking gear 22 may be performed.

As described above, since, after parking of the vehicle on a slope or inclined road surface, torsional torque generated at the drive shaft 30 may be calculated more accurately using the amount of motor speed fluctuation. When a request to release the parking gear 22 is received, actual release of the parking gear 22 may be performed under the condition that the torsional torque of the drive shaft 30 is removed, shock conventionally applied to a vehicle due to torsional energy accumulated on a drive shaft when a parking gear is released may be reduced.

Fourth Embodiment

Figure 6:
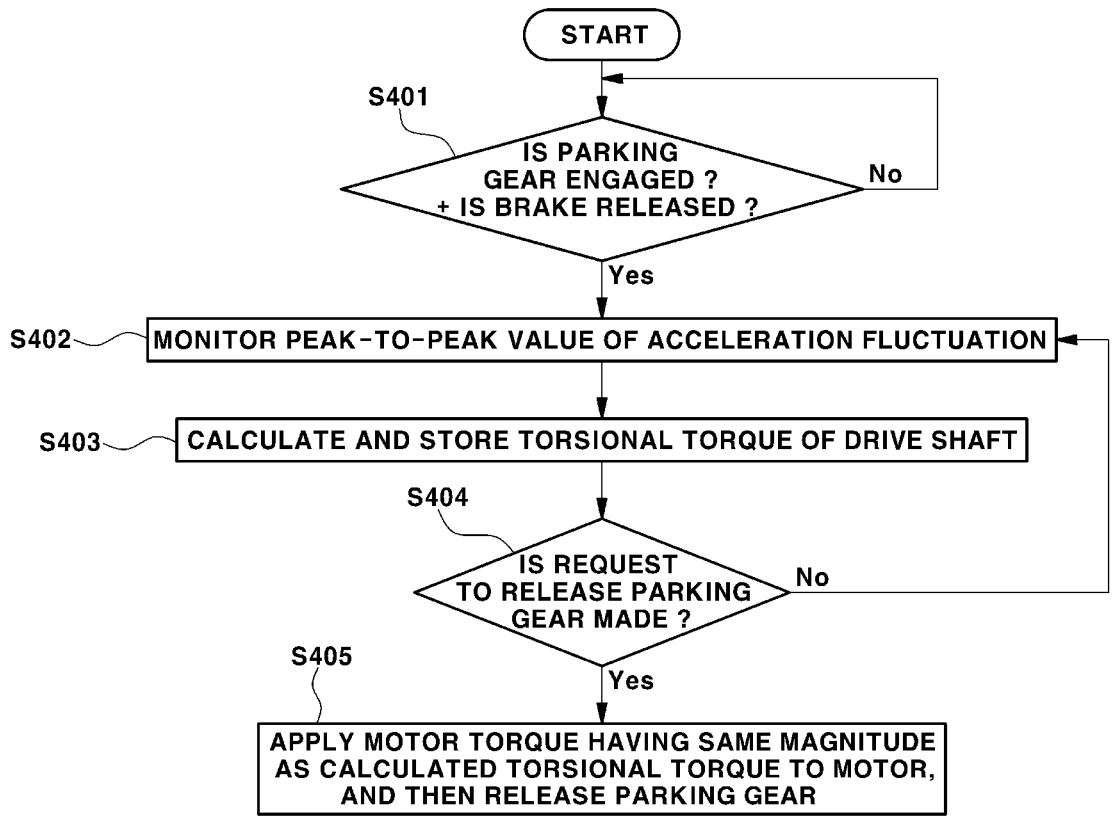
FIG. 6 is a flowchart illustrating a method for reducing torsional shock of a driving system of an electric vehicle in accordance with an exemplary embodiment of the present invention.

FIG. 6 is a flowchart illustrating a method for reducing torsional shock of a driving system of an electric vehicle in accordance with an embodiment of the present invention. First, whether the parking gear 22 is engaged and whether a brake is released may be confirmed (Operation S401).

When a driver shifts the gear lever at the P position through the gear shift unit 51, a P position signal is transmitted to the shift controller 50, the shift controller 50 may be configured to transmit the P position signal to the motor controller 40, and the motor controller 40 may be configured to determine that the parking gear 22 is in the engaged state. Further, when the driver disengages a brake pedal, a brake release signal is transmitted to the motor controller 40, and the motor controller 40 may be configured to determine that the brake is released. Thereafter, an amount of acceleration fluctuation of the vehicle may be monitored and calculated (Operation S402). In particular, when the acceleration sensor 42 monitors acceleration of the vehicle and transmits the acceleration to the motor controller 40, the motor controller 40 may be configured to calculate the amount of acceleration fluctuation.

As exemplarily shown in FIG. 7A, if the vehicle is parked on a flat surface, even when the brake is released after the parking gear 22 is engaged, torsion is not generated at the drive shaft 30 and thus a vehicle acceleration does not fluctuate in a state before starting-off of the vehicle. On the contrary, as exemplarily shown in FIG. 7B, if the vehicle is parked on a slope or inclined road surface, when the brake is released after the parking gear 22 is engaged, torsion is generated at the drive shaft 30, the vehicle is slightly pushed back at the same time, and a vehicle acceleration fluctuates.

Accordingly, the motor controller 40 may be configured to calculate a difference between an upper peak and a lower peak, i.e., a peak-to-peak value, when the acceleration fluctuates, as the amount of acceleration fluctuation. Thereafter, the motor controller 40 may be configured to calculate current torsional torque of the drive shaft 30 that corresponds to a part of the driving system based on the calculated amount of acceleration fluctuation, and store the calculated current torsional torque of the drive shaft 30 (Operation S403). For this purpose, when the current torsional torque of the drive shaft 30 based on the calculated amount of acceleration fluctuation is calculated, amounts of motor speed fluctuation according to road slopes measured in advance through tests and torsional torques of the drive shaft 30 according to the amounts of motor speed fluctuation measured in advance through tests are built as map data, and the map data may be stored in the motor controller 40.

Therefore, the motor controller 40 may be configured to store (e.g., add) the amount of acceleration fluctuation calculated in Operation S402 into the map data, acquire the current torsional torque of the drive shaft 30 corresponding to the amount of acceleration fluctuation stored into the map data, and store the current torsional torque of the drive shaft 30. Thereafter, whether a request to release the parking gear 22 is received may be confirmed (Operation S404).

When the driver shifts the gear lever from the P position to the D position through the gear shift unit 51, a D position signal is transmitted to the shift controller 50, the shift controller 50 may be configured to transmit the D position signal to the motor controller 40, and the motor controller 40 may be configured to determine that the request to release the parking gear 22 is received. Thereafter, the motor controller 40 may be configured to apply motor torque to the motor 10 to remove torsion of the drive shaft 30 prior to actual release of the parking gear 22, and, at this time, the motor torque having the same magnitude as the torsional torque calculated based on the motor speed in Operation S403 may be applied to the motor 10 (Operation S405).

When the motor torque having the same magnitude as the torsional torque calculated based on the amount of acceleration fluctuation in Operation S403 is applied to the motor 10, the applied motor torque may be sequentially transmitted to the output gear 21 of the reducer 20 connected to the output shaft of the motor 10 and the drive shaft 30 coaxially connected to the output gear 21 of the reducer 20, and thus torsion of the drive shaft 30 may be removed. Thereafter, the motor controller 40 may be configured to transmit a parking gear release permissive signal to the shift controller 50, the shift controller 50 may be configured to apply an operation control signal to the solenoid to operate the parking gear 22, the parking gear 22 may be disengaged from the output gear 21 of the reducer 20 by operation of the solenoid, and thereby actual release of the parking gear 22 may be performed.

As described above, since, after parking of the vehicle on a slope, torsional torque generated at the drive shaft 30 may be calculated more accurately using the amount of acceleration fluctuation and, when a request to release the parking gear 22 is received, actual release of the parking gear 22 may be performed under the condition that the torsional torque of the drive shaft 30 is removed, shock conventionally applied to a vehicle due to torsional energy accumulated on a drive shaft when a parking gear is released may be reduced.

The torque having the same magnitude as the current torsional torque of the drive shaft 30 calculated based on the amount of motor speed fluctuation and applied to the motor 10 in the previous exemplary embodiment and the torque having the same magnitude as the current torsional torque of the drive shaft 30 calculated based on the amount of acceleration fluctuation and applied to the motor 10 in this exemplary embodiment may be used as correction factors when torque to relieve shock generated on the vehicle due to torsional energy accumulated on the drive shaft 30 is calculated.

Figure 9:
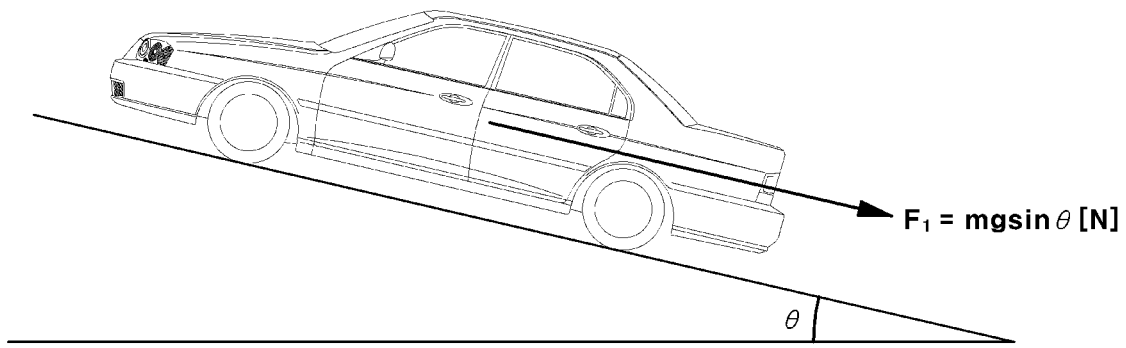
FIG. 9 is a view illustrating force applied to an electric vehicle parked on a slope in accordance with an exemplary embodiment of the present invention.

FIG. 9 is a view illustrating force applied to an electric vehicle parked on a slope or inclined road surface.

If an electric vehicle having a weight m is parked on a slope having a designated angle θ, force F1 applied to the electric vehicle by gravity may be calculated as Equation 1 below.

$$F1 = m \times g \times \sin \theta \, [N] \quad \text{Equation 1}$$

In Equation 1 above, g indicates an acceleration due to gravity.

The electric vehicle may be pushed by the force F1, and, at this time, since a parking gear is in the engaged state, the force F1 causes torsion of a drive shaft.

A magnitude F2 of the torsion of the drive shaft may be calculated by Equation 2 below.

$$F = F1 \times \text{WheelRadius}/\text{GearRatio} = m \times g \times \sin \theta \times \text{WheelRadius}/\text{GearRatio} \, [Nm] \quad \text{Equation 2}$$

In Equation 2 above, m indicates a weight of the electric vehicle, g indicates an acceleration due to gravity, θ indicates an angle of the slope, and, instead of a gear ratio, a reduction ratio of a reducer of the vehicle may be substituted in Equation 2. Equation 2 above is also expressed as Equation 3 based on motor torque F3.

$$F3 = F2/\text{GearRatio}(\text{ReductionRatio}) \, [Nm] \quad \text{Equation 3}$$

When the parking gear is released (the P position is released), shock caused by torsion of the drive shaft corresponding to a part of a driving system may be reduced by applying the torque F3 to a motor. However, the torque F3 is torque if torsion of the drive shaft is ideally generated, and torsion of the drive shaft may be actually miscalculated in the following cases:

(1) If the vehicle is supported by a stopper or a chock on the ground;
(2) If a parking brake is engaged before parking;
(3) If the weight of the vehicle is changed; and
(4) If inaccuracy in measurement of an acceleration sensor and a measurement error occur.

Therefore, the torque having the same magnitude as the current torsional torque of the drive shaft 30 calculated based on the amount of motor speed fluctuation and applied to the motor 10 in the third embodiment and the torque having the same magnitude as the current torsional torque of the drive shaft 30 calculated based on the amount of acceleration fluctuation and applied to the motor 10 in the fourth embodiment may be used as correction factors when motor torque F3 to relieve shock generated on the vehicle due to torsional energy accumulated on the drive shaft 30 is calculated.

As is apparent from the above description, a method for reducing torsional shock of a driving system of an electric vehicle in accordance with the present invention may have effects as follows. Since, after parking of the vehicle on a slope, torsional torque generated at a drive shaft corresponding to a part of the driving system may be calculated and, when release of a parking gear is requested, actual release of the parking gear may be performed under the condition that the torsional torque of the drive shaft is removed, shock conventionally applied to a vehicle due to torsional energy accumulated on a drive shaft when a parking gear is released may be reduced.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for reducing torsional shock of a driving system of an electric vehicle, comprising:
 applying, by a motor controller, motor torque to a motor while increasing the motor torque, when a parking gear is engaged and a brake is released;
 monitoring, by a motor speed sensor, a motor speed generated by the motor torque applied to the motor and transmitting the motor speed to the motor controller;
 calculating, by the motor controller, motor torque at a point in time when the motor speed fluctuates as torsional torque of a part of the driving system; and
 applying, by the motor controller, torque having the same magnitude as the calculated torsional torque to the motor to be transmitted to the part of the driving system, when a request to release the parking gear is received, and performing release of the parking gear.

2. The method of claim 1, wherein the torque having the same magnitude as the calculated torsional torque is sequentially transmitted to an output gear of a reducer connected to an output shaft of the motor and a drive shaft coaxially connected to the output gear of the reducer to remove torsion of the drive shaft.

3. A method for reducing torsional shock of a driving system of an electric vehicle, comprising:
 applying, by a motor controller, motor torque to a motor while increasing the motor torque, when a request to release a parking gear is received under the condition that the parking gear is engaged;
 monitoring, by a motor speed sensor, a motor speed generated by the motor torque applied to the motor and transmitting the motor speed to the motor controller; and
 maintaining, by the motor controller, motor torque at a point in time when the motor speed fluctuates for a designated period of time, and performing release of the parking gear.

4. The method of claim 3, wherein the motor torque at the point in time when the motor speed fluctuates is sequentially transmitted to an output gear of a reducer connected to an output shaft of the motor and a drive shaft coaxially connected to the output gear of the reducer to remove torsion of the drive shaft.

5. A method for reducing torsional shock of a driving system of an electric vehicle, comprising:
 monitoring, by a motor speed sensor, a motor speed and transmitting the motor speed to a motor controller, when a parking gear is engaged and a brake is released;

calculating, by the motor controller, an amount of motor speed fluctuation and calculating torsional torque of a part of the driving system based on the calculated amount of motor speed fluctuation; and applying, by the motor controller, torque having the same magnitude as the calculated torsional torque to a motor to be transmitted to the part of the driving system, when a request to release the parking gear is received, and performing release of the parking gear.

6. The method of claim 5, wherein, in the calculating the torsional torque of the part of the driving system based on the calculated amount of motor speed fluctuation, the torsional torque of the part of the driving system is calculated from map data including amounts of motor speed fluctuation according to road slopes measured in advance and torsional torques of the part of the driving system according to the amounts of motor speed fluctuation measured in advance.

7. The method of claim 5, wherein the torque having the same magnitude as the calculated torsional torque is sequentially transmitted to an output gear of a reducer connected to an output shaft of the motor and a drive shaft coaxially connected to the output gear of the reducer to reduce torsion of the drive shaft.

8. A method for reducing torsional shock of a driving system of an electric vehicle, comprising:

monitoring, by a vehicle acceleration sensor, an acceleration of the electric vehicle and transmitting the acceleration to a motor controller, when a parking gear is engaged and a brake is released;

calculating, by the motor controller, an amount of acceleration fluctuation and calculating torsional torque of a part of the driving system based on the calculated amount of acceleration fluctuation; and applying, by the motor controller, torque having the same magnitude as the calculated torsional torque to a motor to be transmitted to the part of the driving system, when a request to release the parking gear is received, and performing release of the parking gear.

9. The method of claim 8, wherein, in the calculating the torsional torque of the part of the driving system based on the calculated amount of acceleration fluctuation, the torsional torque of the part of the driving system is calculated from map data including amounts of acceleration fluctuation according to road slopes measured in advance and torsional torques of the part of the driving system according to the amounts of acceleration fluctuation measured in advance.

10. The method of claim 8, wherein the torque having the same magnitude as the calculated torsional torque is sequentially transmitted to an output gear of a reducer connected to an output shaft of the motor and a drive shaft coaxially connected to the output gear of the reducer to remove torsion of the drive shaft.

* * * * *